(12) United States Patent
Gagliano et al.

(10) Patent No.: US 9,641,430 B2
(45) Date of Patent: May 2, 2017

(54) VERIFYING DATA PLANE PATHS BASED ON A VALIDATED SECURE CONTROL PLANE

(71) Applicant: Cisco Technology, Inc., San Jose, CA (US)

(72) Inventors: Roque Gagliano, Pully (CH); Alvaro E. Retana, Raleigh, NC (US); Keyur P. Patel, San Jose, CA (US); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 219 days.

(21) Appl. No.: 14/160,736

(22) Filed: Jan. 22, 2014

(65) Prior Publication Data
US 2015/0207728 A1   Jul. 23, 2015

(51) Int. Cl.
| H04L 12/721 | (2013.01) |
|---|---|
| H04L 12/24 | (2006.01) |
| H04L 12/26 | (2006.01) |
| H04L 12/715 | (2013.01) |
| H04L 9/32 | (2006.01) |

(52) U.S. Cl.
CPC .............. *H04L 45/44* (2013.01); *H04L 41/12* (2013.01); *H04L 43/10* (2013.01); *H04L 45/04* (2013.01); *H04L 9/3265* (2013.01)

(58) Field of Classification Search
CPC ......... H04L 41/12; H04L 45/44; H04L 43/10; H04L 45/04; H04L 63/101; H04L 63/20; H04L 9/0827; H04L 9/3265
USPC .................................................. 370/254, 410
See application file for complete search history.

(56) References Cited

U.S. PATENT DOCUMENTS

7,194,621 B1    3/2007  Nguyen et al.
7,447,222 B2 *  11/2008 Wakumoto .......... H04L 12/2697
                                                              370/235
7,500,264 B1    3/2009  Leavy et al.
(Continued)

OTHER PUBLICATIONS

Teixeira et al., "A Measurement Framework for Pin-Pointing Routing Changes", Aug. 30, 2004, ACM, SIGCOMM'04 Workshops, pages: all.*

(Continued)

*Primary Examiner* — Un C Cho
*Assistant Examiner* — Shah Rahman
(74) *Attorney, Agent, or Firm* — Parker Ibrahim & Berg LLC; James M. Behmke; Stephen D. LeBarron

(57) ABSTRACT

In one embodiment, a plurality of packets is sent from an origin device along a communication path toward a destination device. Each packet includes a lifespan indicator which is incrementally increased for each subsequently sent packet. A plurality of response messages are received at the origin device from a plurality of intermediate devices, respectively. A plurality of secure path objects included in the plurality of response messages, respectively, is determined. Additionally, the plurality of secure path objects are validated based on validation information accessible by the origin device. Validation results of the plurality of secure path objects are checked to determine whether a packet that is sent from the origin device and received by the destination device travels along a particular communication path as dictated by control plane information.

19 Claims, 7 Drawing Sheets

(56) References Cited

U.S. PATENT DOCUMENTS

| | | | | |
|---|---|---|---|---|
| 8,072,901 | B1* | 12/2011 | Blair | H04L 45/00 370/254 |
| 8,874,771 | B2* | 10/2014 | Munger | H04L 29/12216 709/230 |
| 8,943,201 | B2* | 1/2015 | Larson | H04L 29/12216 709/225 |
| 2006/0239199 | A1* | 10/2006 | Blair | H04L 45/54 370/248 |
| 2007/0248091 | A1 | 10/2007 | Khalid et al. | |
| 2008/0025320 | A1 | 1/2008 | Bangalore et al. | |
| 2008/0080507 | A1* | 4/2008 | Swallow | H04L 43/50 370/392 |
| 2008/0151764 | A1* | 6/2008 | Wing | H04L 41/12 370/248 |
| 2009/0135728 | A1* | 5/2009 | Shen | H04L 43/12 370/250 |
| 2009/0198832 | A1* | 8/2009 | Shah | H04L 41/0668 709/239 |
| 2009/0232011 | A1* | 9/2009 | Li | H04L 43/50 370/248 |
| 2010/0034207 | A1 | 2/2010 | Mcgrew et al. | |
| 2010/0202466 | A1* | 8/2010 | Eswaran | H04L 45/02 370/400 |
| 2010/0284403 | A1* | 11/2010 | Scudder | H04L 45/124 370/392 |
| 2012/0110334 | A1* | 5/2012 | Rossi | H04L 29/12066 713/176 |
| 2013/0259056 | A1* | 10/2013 | Kotrabasappa | H04L 45/24 370/401 |
| 2013/0286831 | A1* | 10/2013 | Zwall | H04L 45/02 370/235 |
| 2013/0322258 | A1* | 12/2013 | Nedeltchev | H04L 43/04 370/241 |

OTHER PUBLICATIONS

Bahadur, et al., "Mechanism for Performing Label Switched Path Ping (LSP Ping) Over MPLS Tunnels", Internet Engineering Task Force, Request for Comments 6424, Nov. 2011, 23 pages, Internet Engineering Task Force Trust.

Conta, et al., "Internet Control Message Protocol (ICMPv6) for the Internet Protocol Version 6 (IPv6) Specification", Network Working Group, Request for Comments 4443, Mar. 2006, 24 pages, The Internet Society.

Bonica et al., "Extended ICMP to Support Multi-Part Messages," Network Working Group, Request for Comments: 4884, Standards Track, Apr. 2007, 1 page, The Internet Engineering Task Force Trust.

Bonica et al., "ICMP Extensions for Multiprotocol Label Switching," Network Working Group, Request for Comments: 4950, Standards Track, Aug. 2007, 1 page, The Internet Engineering Task Force Trust.

Oppleman, et al., http://pwhois.org/lft/lft-manpage.html, Aug. 2002, 5 pages, Prefix WhoIs.

Postel, J., "Internet Control Message Protocol: Darpa Internet Program Protocol Specification", Network Working Group, Request for Comments 792, 21 pages, Sep. 1981, The Internet Engineering Task Force Trust.

Rekhter, et al., "A Border Gateway Protocol 4 (BGP-4)", Network Working Group, Request for Comments 1771, Mar. 1995, 57 pages, The Internet Engineering Task Force Trust.

Shen et al., "ICMP Extensions for Routing Instances," Internet: draft-shen-icmp-routing-inst-00.txt, Expires May 2007, Nov. 2006, 1 page, The Internet Society.

Shen et al., "Traceroute and Ping Message Extension," Internet: draft-shen-traceroute-ping-ext-04, expires Aug. 30, 2012, Standards Track, Feb. 27, 2012, 1 page, The Internet Engineering Task Force Trust.

"MTR (Software)", http://en.wikipedia.org/wiki/MTR_(software), Nov. 2013, 3 pages, the Wikimedia Foundation, Inc.

* cited by examiner

# VERIFYING DATA PLANE PATHS BASED ON A VALIDATED SECURE CONTROL PLANE

TECHNICAL FIELD

The present disclosure relates generally to computer networks, and, more particularly, to the verification of whether a data plane packet has taken a path validated at the control plane.

BACKGROUND

An Autonomous System (AS) is a network or group of networks under common administration and with common routing policies. A typical example of an AS is a network administered and maintained by an Internet Service Provider (ISP). Customer networks, such as universities or corporations, connect to the ISP, and the ISP routes the network traffic originating from the customer networks to network destinations that may be in the same ISP or may be reachable only through other ISPs.

To facilitate the routing of network traffic through one or more ASes, the network elements of the ASes need to exchange routing information to various network destinations. Border Gateway Protocol (BGP) is an Exterior Gateway Protocol (EGP) that is used to exchange routing information among network elements (e.g., routers) in the same or different ASes. A computer host that executes a BGP process is typically referred to as a BGP host or a BGP device. To exchange BGP routing information, two BGP hosts, or peers, first establish a transport protocol connection with one another. Initially, the BGP peers exchange messages to open a BGP session, and, after the BGP session is open, the BGP peers exchange their entire routing information. Thereafter, only updates or changes to the routing information are exchanged, or advertised, between the BGP peers. The exchanged routing information is maintained by the BGP peers during the existence of the BGP session.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a plurality of packets is sent from an origin device along a communication path toward a destination device. Each packet includes a lifespan indicator which is incrementally increased for each subsequently sent packet. A plurality of response messages are received at the origin device from a plurality of intermediate devices, respectively. A plurality of secure path objects included in the plurality of response messages, respectively, is determined. Additionally, the plurality of secure path objects are validated based on validation information accessible by the origin device. Validation results of the plurality of secure path objects are checked to determine whether a packet that is sent from the origin device and received by the destination device travels along a particular communication path as dictated by control plane information.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 1:
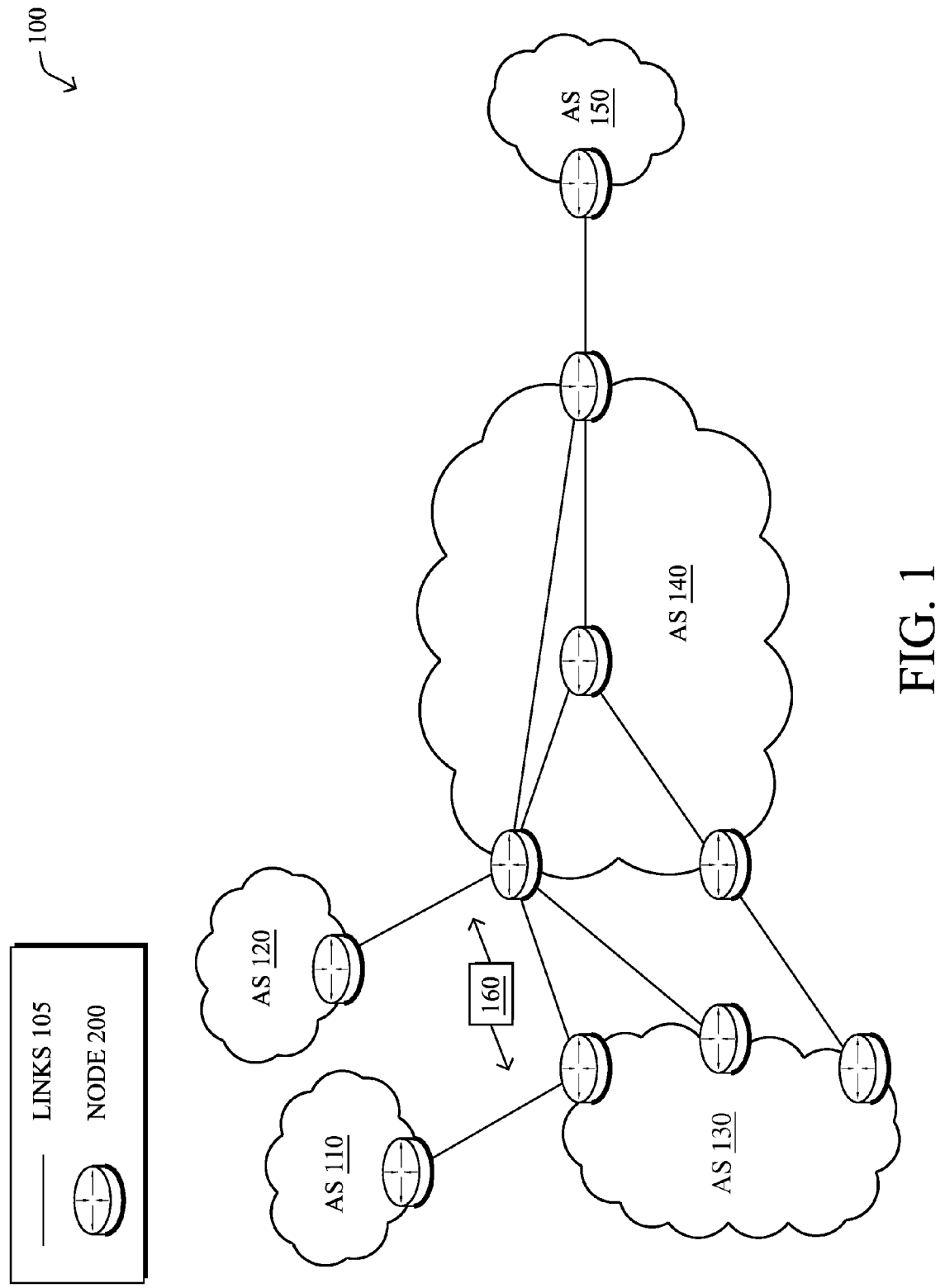
FIG. 1 illustrates an example communication network including one or more ASes.
Figure 2:
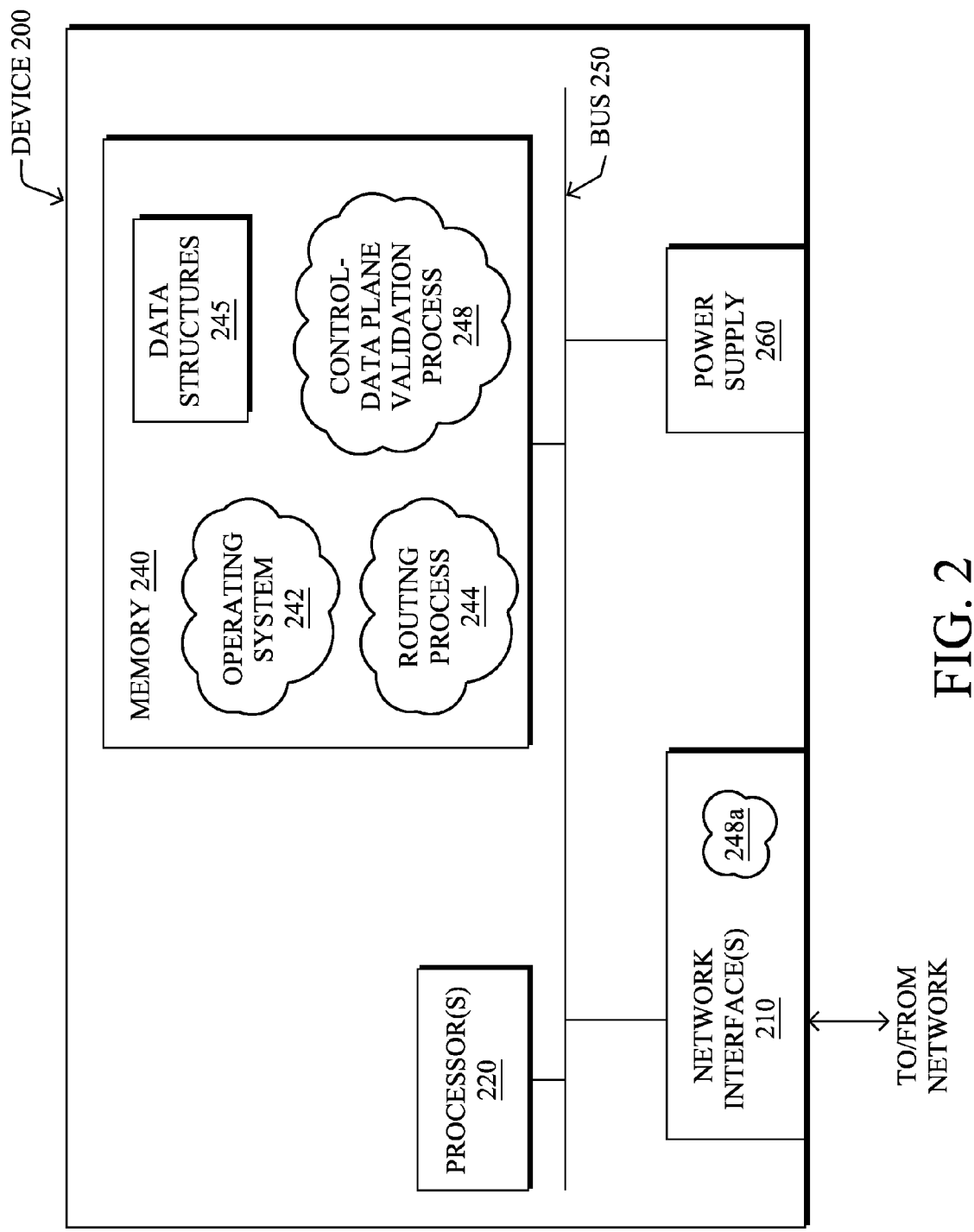
FIG. 2 illustrates an example network device/node.

FIG. 1 is a schematic block diagram of an example computer network 100 illustratively comprising nodes/devices 200 (e.g., as depicted in FIG. 2) interconnected by various methods of communication. For instance, the links 105 may be any suitable combination of wired links and shared media (e.g., wireless links, Internet Exchange Points, etc.) where certain nodes 200, such as, e.g., routers, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity.

Data packets 160 (e.g., traffic and/or messages sent between the devices/nodes) may be exchanged among the nodes/devices of the computer network 100 using predefined network communication protocols such as certain known wired protocols, as well as wireless protocols or other shared-media protocols where appropriate.

The computer network 100 includes a set of autonomous systems (AS) 110, 120, 130, 140 and 150. The computer network 100 may be positioned in any suitable network environment or communications architecture that operates to manage or otherwise direct information using any appropriate routing protocol or data management standard. For example, computer network 100 may be provided in conjunction with a border gateway protocol (BGP).

As noted above, an AS may be a collection of connected Internet Protocol (IP) routing devices under the control of one or more network operators that presents a common, clearly defined routing policy to a network (e.g., the Internet). Usually, an AS comprises network devices, e.g., nodes/devices 200, that are established on the edge of the system, and that serve as the system's ingress and egress points for network traffic. Moreover, the devices 200 may be considered edge devices, border routers, or core devices within the respective AS. These network elements typically, but not always, are routers or any other element of network infrastructure suitable for switching or forwarding data packets according to a routing protocol or switching protocol. For the purposes of the present disclosure, the network elements located within an AS may alternatively be referred to as "forwarding devices" or "intermediate devices." Moreover, for illustration purposes, the ASes 110, 120, 130, 140 and 150 are shown with a limited number of devices 200. In an actual implementation, however, an AS normally comprises numerous routers, switches, and other elements.

Each AS 110, 120, 130, 140 and 150 may be associated with an Internet Service provider (ISP). Even though there may be multiple ASes supported by a single ISP, the Internet only sees the routing policy of the ISP. That ISP must have an officially registered Autonomous System Number (ASN). As such, a unique ASN is allocated to each AS for use in BGP routing. ASNs are important primarily because they uniquely identify each network on the Internet.

To facilitate the routing of network traffic through the ASes, or more specifically, the devices 200 within the ASes, the devices may exchange routing information to various network destinations. As described above, BGP is conventionally used to exchange routing and reachability information among network elements, e.g., devices 200, within a single AS or between different ASes. One particular example of BGP is BGPv4, as defined in Request for Comments (RFC) 1771 of the Internet Engineering Task Force (IETF). Various embodiments may implement other versions of BGP, however, and the use of BGPv4 is not required. The BGP logic of a router is used by the data collectors to collect BGP AS path information, e.g., the "AS_PATH" attribute, as described further below, from BGP tables of border routers of an AS, to construct paths to prefixes.

To exchange BGP routing information, two BGP hosts (devices 200), or peers, first establish a transport protocol connection with one another. Initially, the BGP peers exchange messages to open a BGP session, and, after the BGP session is open, the BGP peers exchange their entire routing information. Thereafter, in certain embodiments, only updates or changes to the routing information, e.g., the "BGP UPDATE" attribute, are exchanged, or advertised, between the BGP peers. The exchanged routing information is maintained by the BGP peers during the existence of the BGP session.

The BGP routing information may include the complete route to each network destination, e.g., "destination device," that is reachable from a BGP host. A route, or path, comprises an address destination, which is usually represented by an address prefix (also referred to as prefix), and information that describe the path to the address destination. The address prefix may be expressed as a combination of a network address and a mask that indicates how many bits of the address are used to identify the network portion of the address. In Internet Protocol version 4 (IPv4) addressing, for example, the address prefix can be expressed as "9.2.0.2/16". The "/16" indicates that the first 16 bits are used to identify the unique network leaving the remaining bits in the address to identify the specific hosts within this network.

A path joining a plurality of ASes, e.g., links 105, may be referred to as an "AS_PATH." The AS_PATH attribute indicates the list of ASes that must be traversed to reach the address destination. For example, as illustrated in FIG. 1, the AS 130 may store an AS_PATH attribute of "110 120 140 150" where the address destination is the AS 150 (or a particular IP address within AS 150). Here, the AS_PATH attribute indicates that the path to the address destination AS 150 from AS 130 passes through ASes 110, 120 and 140, in that order.

Although it may be preferable that all devices 200 in the respective ASes 110, 120, 130, 140 and 150 be configured according to BGP, in a real-world implementation, it may be unlikely that each device communicates using BGP. Thus, the disclosed embodiments are applicable to scenarios where all devices 200 in the network 100 are configured according to BGP, as well as scenarios where only a subset of the devices 200 is configured as such. Moreover, between any of the ASes, there may be a single communication path 105, e.g., between AS 110 and AS 130, as shown in FIG. 1, or there may be multiple communication paths 105, e.g., between AS 120 and AS 140. Thus, the disclosed embodiments are applicable to either case, as described in further detail below.

Moreover, a security extension to the BGP has been developed, referred to as BGPSEC, which provides improved security for BGP routing. BGP does not include mechanisms that allow an AS to verify the legitimacy and authenticity of BGP route advertisements. The Resource Public Key Infrastructure (RPKI) provides a first step towards addressing the validation of BGP routing data. BGPSEC extends the RPKI by adding an additional type of certificate, referred to as a BGPSEC router certificate, that binds an AS number to a public signature verification key, the corresponding private key of which is held by one or more BGP speakers within this AS. Private keys corresponding to public keys in such certificates can then be used within BGPSEC to enable BGP speakers to sign on behalf of their AS. The certificates thus allow a relying party to verify that a BGPSEC signature was produced by a BGP speaker belonging to a given AS. Thus, a goal of BGPSEC is to use signatures to protect the AS Path attribute of BGP update messages so that a BGP speaker can assess the validity of the AS Path in update messages that it receives. It should be understood, however, that the embodiments for implementing AS Path security disclosed herein are not limited to BGPSEC; certain embodiments may, additionally or alternatively, be applicable to other suitable protocols, including, for example, SoBGP, S-BGP, and PGPBGP, to name just a few.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, etc.), at least one processor 220, and a memory 240 interconnected by a system bus 250, as well as a power supply 260 (e.g., battery, plug-in, etc.). Furthermore, the device 200 may be part of an AS, as illustrated in FIG. 1.

The network interface(s) 210 contain the mechanical, electrical, and signaling circuitry for communicating data over links 105 coupled to the network 100, and thus effecting communication among the ASes 110, 120, 130, 140 and 150. The network interfaces may be configured to transmit and/or receive data using a variety of different communication protocols. The nodes may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, in accordance with BGP or BGPSEC, for example, and an illustrative control-and-data plane validation ("control-data plane validation") process 248, as described herein. While control-data plane validation 248 is shown in centralized memory 240, alternative embodiments provide for the process to be specifically operated within the network interfaces 210, such as a component of a MAC layer (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as a BGP or BGPSEC, as described above. Alternatively, or additionally, the routing process 244 may be configured according to a non-BGP protocol, such as various proactive or reactive routing protocols, as will be understood by those skilled in the art. As described above, the disclosed embodiments are applicable to cases where each router in a single AS, or in several ASes, follows BGP, as well as cases where only a subset of routers follow BGP, whereby the remaining routers are configured according to a different routing protocol. In either case, functions may, on capable devices, be configured to manage a routing/forwarding table (a data structure 245) containing, e.g., data used to make routing/forwarding decisions. In the case of BGP, for example, the BGP logic of a router, e.g., routing process 244, is used to collect BGP AS_PATH information from BGP tables of border routers, e.g., "peers," of an AS, to construct paths to various destinations. BGP peers exchange or advertise routes using information stored in their routing table, e.g., a data structure 245, via the BGP UPDATE message.

As noted above, routing security is a key concern in BGP-configured AS networks. When dealing with routing security, one must consider various aspects of the router architecture, including the so-called data plane and control plane. The data plane (or "forwarding plane") defines the part of the router architecture that decides what to do with packets arriving on an inbound interface. Commonly, it refers to a table in which the router looks up the destination address of the incoming packet and retrieves the information necessary to determine the path from the receiving element, through the internal forwarding fabric of the router, and to the proper outgoing interface(s). Put another way, the data plane involves network traffic that goes through the router, instead of to the router.

On the other hand, the control plane defines the part of the router architecture that is concerned with developing the network map, or the information in a routing table that defines what to do with incoming packets. Control plane functions, such as operating in accordance with routing protocols, run in the architectural control element. In contrast to the data plane, the control plane involves network traffic that is destined to or locally originated by the router itself.

In contrast to certain previous or existing solutions, certain embodiments of the present disclosure may concurrently validate both data plane traffic and control plane traffic. For instance, the Internet Control Message Protocol (ICMP) extensions at best provide for, among other things, a "traceroute," which may perform a data continuity check within the data plane. ICMP is a known Internet protocol which may refer to, for example, ICMPv4 (RFC 792) or ICMPv6 (RFC 4443). ICMP may refer to other suitable variations or applications of ICMP, as well, such as that of RFC 4884, which extends selected ICMP messages to support multi-part messages that carry all of the information carried by standard ICMP messages, as well as additional information that applications may require. Certain embodiments of the present disclosure, however, may concurrently validate both data plane traffic and control plane traffic (although implementation of this technique is optional).

A specialized BGP attribute, known as the BGPSEC_Path_Signature, may be used to digitally sign the different ASes a control plane packet has traversed, though this technique may fail to validate whether a data plane packet has actually taken the path validated at the control plane. In other words, there is no way to correlate and verify the security control-and-data plane synchronization (e.g., "connectivity verification") for data traveling across ASes in a computer network. Certain embodiments of the present disclosure, however, may allow or perform validation of whether a data plane packet actually has taken the path validated at the control plane, and may correlate and verify the security control-and-data plane synchronization (e.g., "connectivity verification") for data traveling across ASes in a computer network.

Control-and-Data Plane Validation

Certain embodiments described herein may solve the problem of verifying whether packets are following the secure control plane information. Certain embodiments are based on the traceroute application, but in addition to the traceroute application, routers in a path between an origin device and a destination device dump their secure control plane signed information in a new ICMP extension object, and the origin device will validate every packet, as well as the consistency of the information received by the different hops.

Specifically, according to one or more embodiments of the disclosure as described in detail below, a plurality of packets is sent from an origin device in a computer network along a communication path toward a destination device in the computer network. Each packet includes a lifespan indicator which is incrementally increased for each subsequently sent packet. Then, a plurality of response messages are received at the origin device from a plurality of intermediate devices, respectively, whereby each intermediate device is located along the communication path between the origin device and the destination device. Notably, a response message is received from an intermediate device when the intermediate device receives a packet of the plurality of packets and the lifespan indicator of the received packet has expired. A plurality of secure path objects included in the plurality of response messages, respectively, is subsequently determined. Each secure path object defines a hop-by-hop path from a corresponding intermediate device to the destination device, in accordance with control plane information associated with the corresponding intermediate device. Additionally, the plurality of secure path objects are validated based on validation information accessible by the origin device. Then, validation results of the plurality of secure path objects are checked to determine whether a packet that is sent from the origin device and received by the destination device travels along a particular communication path as dictated by control plane information. The origin device, the destination device, and the plurality of intermediate devices are each part of a respective autonomous system (AS).

Illustratively, the techniques described herein may be performed by hardware, software, and/or firmware, such as in accordance with the "control-data plane validation" process 248/248a, which may contain computer executable instructions executed by the processor 220 (or independent processor of interfaces 210) to perform functions relating to the techniques described herein, e.g., in conjunction with routing process 244. For example, the techniques herein may be treated as extensions to BGP, or other suitable communication protocols, and as such, may be processed by similar components understood in the art that execute those protocols, accordingly. Moreover, the "control-data plane validation" process 248/248a may be hosted within the particular router, e.g., the device 200, as shown in FIG. 2, or may alternatively be hosted outside the device 200.

Operationally, certain embodiments leverage current routing security mechanisms, such as those related to BGP and BGPSEC, for example, and specify the behavior of a requesting host when launching a path verification request. Additionally or alternatively, certain embodiments may be considered "intrusive," as they introduce testing packets and a feedback mechanism for the source, e.g., "origin device," which may include a terminal, server, or other suitable network device, to analyze the synchronization between control and data plane. Certain embodiments may also be considered an "active" method, as they utilize synthetic probes and back-signals. Certain embodiments may advantageously be used as a troubleshooting tool or active monitoring mechanism to acquire statistic information. For example, certain disclosed techniques may be launched by an operator at a network operation center.

Figure 3:
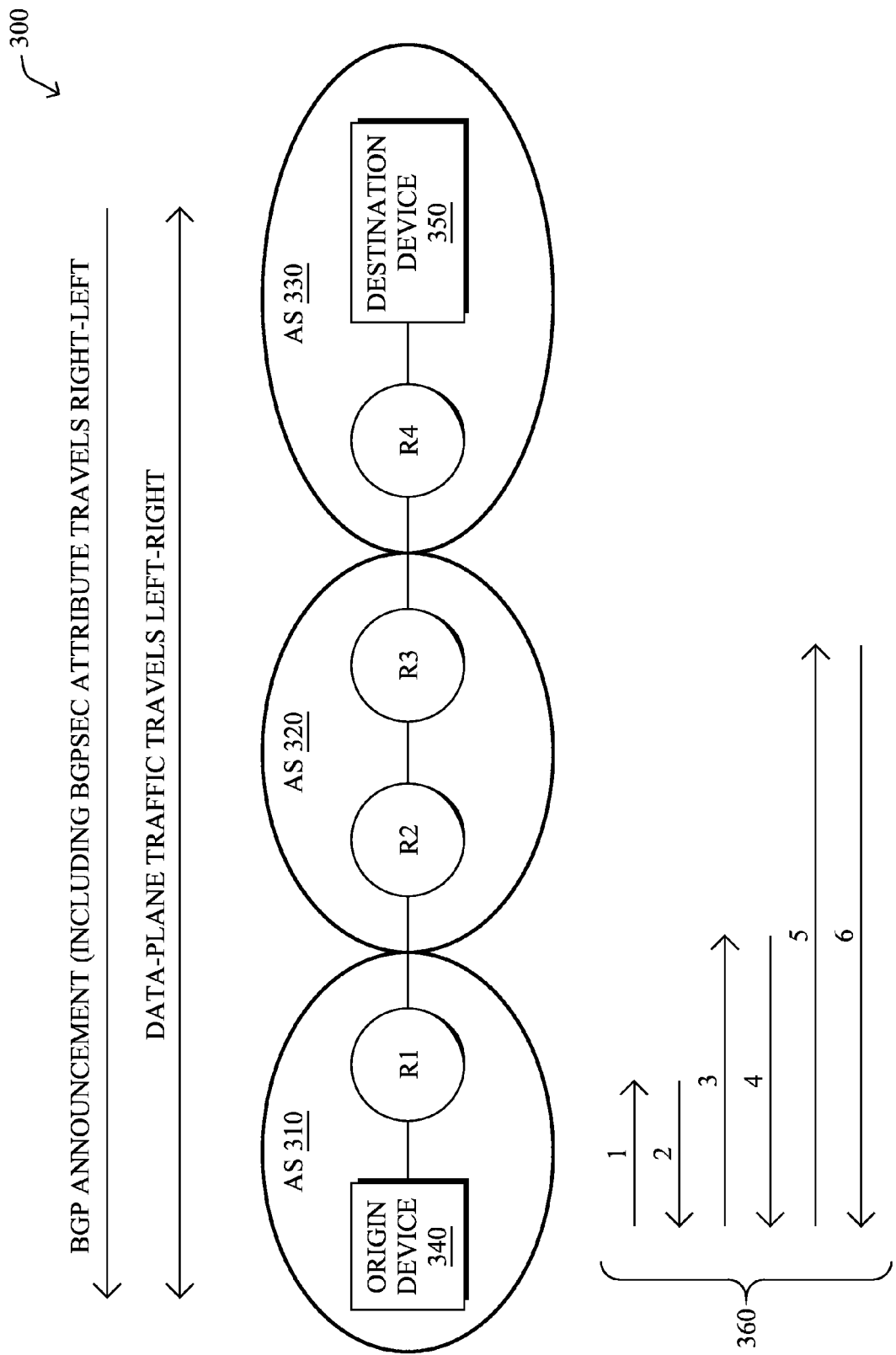
FIG. 3 illustrates an example of data plane secure path verification using a secure control plane.

FIG. 3 illustrates an example of data plane secure path verification using a secure control plane. As shown in FIG. 3, computer network 300 is a network of different autonomous systems, such as ASes 310, 320 and 330, in communication with one another via intermediate devices R1, R2, R3 and R4.

ASes 310, 320 and 330 include a plurality of network devices, such as routers, terminals, or the like. Illustratively, AS 310 includes intermediate device R1 and origin device 340; AS 320 includes intermediate devices R2 and R3; and AS 33 includes intermediate device R4 and destination device 350. Furthermore, each AS 310, 320 and 330 may include a set of edge routers and core routers. It should be understood that ASes 310, 320 and 330 may be arranged in any suitable manner within the computer network 300, with any configuration of network devices being located in the respective AS. That is, in an actual implementation, there may be any number of ASes in the network, and any number of intermediate devices in a particular AS.

Intermediate devices R1, R2, R3 and R4 may be any suitable network device, e.g., "forwarding devices," routers, or the like, as described in detail above. Moreover, the intermediate devices R1, R2, R3 and R4 may be located along the communication path between the origin device 340 and the destination device 350. The intermediate devices R1, R2, R3 and R4 may be edge routers or core routers. Furthermore, the intermediate devices R1, R2, R3 and R4 may each be configured according to BGP, or only a subset of the intermediate devices may be configured according to BGP. Notably, in the case where only a subset of the intermediate devices are configured according to BGP, the origin device 340, or other device in the network 300, may send queries requesting identification of the intermediate devices not configured according to BGP. Within the construct of a primarily BGP-configured network, the edge routers may participate in the inter-domain routing system by speaking BGP, and especially BGPSEC. Thus, in certain embodiments, all edge routers may have cryptographic information of the AS_PATH the BGP UPDATE messages that have traveled through them and will make decisions based on that information. Particularly, incoming edge devices receiving BGP UPDATES may perform BGPSEC validations, while outgoing edge devices may perform BGPSEC signing.

Illustratively, the origin device 340 may be located in AS 310 and may be in communication with intermediate device R1 via a communication link. The origin device 340 may be any terminal suitable for transmitting data packets throughout the network 300 and checking the validity of received secure path objects, as described in further detail below, using, e.g., information available in the RPKI (by communicating to a RPKI validation server or cache). Also, the destination device 350 may be located in AS 330 and may be in communication with intermediate device R4 via a communication link. The origin device 340 and destination device 350 may be in communication with one another via a communication path that traverses a plurality of intermediate devices R1, R2, R3 and R4 and a plurality of ASes 310, 320 and 330. Although a single communication path between origin device 340 and destination device 350 is shown in FIG. 3, multiple possible communication paths, as well as multiple AS_PATHs (e.g., paths between ASes), may exist between origin device 340 and destination device 350.

The control-and-data plane validation process 360 depicts a step-by-step process flow by which a plurality of data packets are sent from the origin device 340 toward the destination device 350, and a plurality of response messages are received by the origin device 340, to verify whether a data plane packet has taken a path validated at the control plane. In particular, the origin device 340 may initiate a verification process similar to a traceroute process. The traceroute process is a network diagnostic tool that effectively performs a data continuity check within the data plane by revealing a communication path taken by the packets and measuring transit delays of the packets across the network. The arrows in the process 360 illustratively indicate packet flow, as well as the sender of a packet and a recipient of the same.

The origin device 340 may send a plurality of packets, e.g., User Datagram Protocol (UDP) or ICMP echo packets or probes, along a communication path toward the destination device 350, which may traverse the intermediate devices R1, R2, R3 and R4. The plurality of packets may contain a request for response, or may be opaque.

Each packet of the plurality of packets sent by the origin device 340 may include a lifespan indicator, which is a mechanism for limiting the lifespan or lifetime of a respective data packet in the network 300. The lifespan indicator may be a time-to-live (TTL) attribute, a hop limit (HL) attribute, or the like. The lifespan indicator may be implemented as a counter or timestamp attached to or embedded in the respective data packet. In the data path, each IP hop may decrement the lifespan indicator, e.g., TTL/HL value, by one. Moreover, the lifespan indicator is incrementally increased for each subsequently sent packet, the effect of which is described in further detail below.

The packet may continue to be transmitted to the next intermediate device in sequence until the packet expires. When the lifespan indicator associated with a particular packet expires, or in other words, when the TTL field reaches zero, the intermediate device which receives the expired packet will send a response message back to the originator, e.g., the origin device 340. The response message may be an ICMP Time Exceeded packet, which informs the origin device 340 of a discarded data packet due to the lifespan indicator, e.g., TTL field, reaching zero.

Moreover, the intermediate device originating the response message may include with the response message a "secure path object" defining a hop-by-hop path from the corresponding intermediate device to the destination device 350. The secure path object may be a dump of the control secure option of the corresponding intermediate device, in accordance with control plane information associated with the corresponding intermediate device, which may include, for example, a BGP-based path attribute, such as a BGPSEC Path Signature, based on the selected destination device 350. The BGPSEC Path Signature consists of a sequence of digital signatures, one for each AS in the AS_PATH of a BGP UPDATE message. A new signature may be added to this sequence each time an update message leaves an AS. The signature is constructed so that any tampering with the AS_PATH or Network Layer Reachability Information (NLRI) in the BGPSEC update message will result in the recipient being able to detect that the update is invalid.

Additionally, the secure path object included by the response message may be an extension of ICMP, e.g., an ICMP Multipart Object. The estimated size of the secure path object may be less than 400 bytes in a typical network configuration, and as such, fragmentation may rarely be needed.

Since data plane packets travel in an opposite direction as the BGP UPDATE messages (as depicted by the arrows near the top of FIG. 3), it may be appropriate for the edge intermediate devices, e.g., EXIT BGPSEC routers, to participate in the control-and-data plane validation process 360. However, the core intermediate devices, e.g., INGRESS BGPSEC routers, need not necessarily participate in the control-and-data plane validation process 360, as the information provided by those devices would be redundant in view of the edge/exit devices.

As illustrated in FIG. 3, the origin device 340 may send the first packet (e.g., "1" as shown in process 360) of the plurality of packets toward the destination device 350, and that packet may be received by the intermediate device R1. Because the first packet is sent with a lifespan indicator, e.g., TTL/HL, value of one, the lifespan indicator may expire, e.g., has a value of zero, when it reaches the first hop (R1). Then, the intermediate device R1 may send a response message (e.g., "2") back to the origin device 340, whereby the response message may include a secure path object, as described above.

When the origin device 340 receives the response message including the secure path object, it may check the validity of the secure path object using validity information accessible by the origin device 340. The validity information may derive from information in the RPKI, which may be attained by communicating to a RPKI validation server or cache. The RPKI information may verify whether an AS is authorized to advertise/announce a certain prefix to other ASes. The origin device 340 may also save the validation results of the secure path object, e.g., in a storage device. Furthermore, the origin device 340 may transfer the validation process, such that it is performed at an external device, yet the origin device 340 receives the results. The validation process is described in further detail below, with respect to FIG. 4.

Next, the origin device 340 may send a second packet (e.g., "3") of the plurality of packets toward the destination device 350. Importantly, because the lifespan indicator may be incrementally increased for each subsequently sent packet, as explained above, the TTL/HL value equals two for the second packet sent by the origin device 340. As such, the second sent packet may be received by the network device at the second hop, e.g., intermediate device R2, when the lifespan indicator expires. Then, the intermediate device R2 may send a response message (e.g., "4") back to the origin device 340, as explained in detail above. Notably, because the intermediate device R2 may not be an exit/edge router within AS 320, the information it provides in its response message may be redundant. Therefore, response messages may not need to be sent from ingress/core routers, such as intermediate device R2.

This process may be repeated, whereby the lifespan indicator may be incrementally increased for each subsequently sent packet, and the origin device 340 may validate the secure path object of each response message received by the plurality of intermediate devices R1, R2, R3 and R4, as explained above. The process 360 may end once a packet sent by the origin device 340 reaches the destination device 350. When this occurs, the destination device 350 may send a response message to the origin device 340 indicating that a packet of the plurality of packets has been received at the destination device, and that the traceroute process, e.g., process 360, may be stopped (step not shown in FIG. 3). The response message sent from the destination device 350 may be an ICMP message, e.g., ICMP port unreachable with code port unreachable, or ICMP response, e.g., ICMP echo reply.

After a response message is received from the destination device 350, the origin device 340 may check the validation results of the plurality of secure path objects to determine whether the packet sent by the origin device and reached at the destination device 350 traveled along a communication path dictated by control plane information. That is, the origin device 340 may check the validation results of the secure path objects to determine whether the data plane packets are following the secure control plane information. The origin device 340 may check the validation results in a reverse order from an order in which each response message is received, due to a manner in which the BGPSEC Path Signatures are mapped, e.g., "forward mapping." Alternatively, the origin device 340 may check the last-received results only if the AS from which those results were received is included in the AS_PATH declared in the secure path object of the intermediate device at the previous hop. This verification process may continue until the first-received response message and secure path object is checked.

The origin device 340 may determine that the data plane packet sent by the origin device and reached at the destination device 350 traveled along a communication path dictated by control plane information if there is always an AS_PATH from the destination device 350 back to the "source" that is consistent and valid in every step, whereby the source refers to the device whose secure path object is currently being examined. In this case, the testing data packet would have taken a route that is consistent with the validated path in the control plane for every step.

Figure 4:
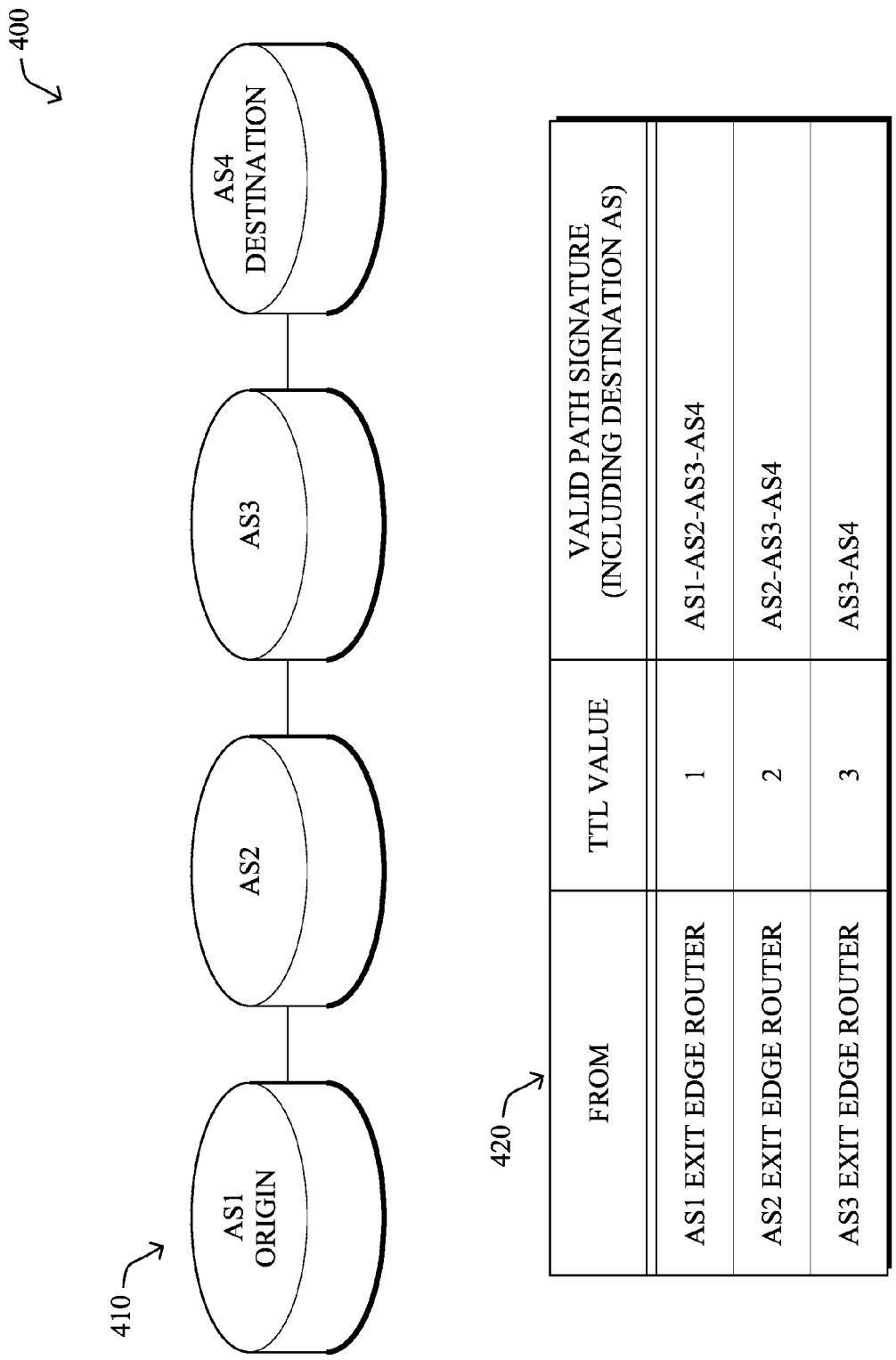
FIG. 4 illustrates an example routing table containing path attributes for one or more intermediate devices.

FIG. 4 illustrates an example routing table containing path attributes for one or more intermediate devices. As shown in FIG. 4, the computer network 400 includes ASes 410 in communication with one another, and the routing table 420 illustrates the secure path object associated with each AS.

The ASes 410 may include a plurality of ASes arranged as AS1-AS2-AS3-AS4. Each AS 410 may include one or more network devices, e.g., exit routers, core routers, etc., and the ASes 410 may be in communication with one another via the network devices in a manner as described above. Illustratively, in the computer network 410, an origin device is located in AS1, while a destination device is located in AS4.

As is illustrated in the routing table 420, a first packet may be sent from the origin device in AS1 with a TTL value, e.g., lifespan indicator, of one. The first packet thus may illustratively expire at the AS1 exit edge router. In response, the AS1 exit edge router may send a response message to the origin device, which is also located in AS1. As described above, each response message may include a secure path object defining a hop-by-hop path, e.g., an AS-by-AS path (AS_PATH), from the corresponding device to the destination device. The origin device may then receive the response message and examine the included secure path object, e.g., path signature, corresponding to the AS1 exit edge router.

Illustratively, the first path signature, e.g., BGPSEC Path Signature, received from the AS1 exit edge router, may define the path AS1-AS2-AS3-AS4, which represents a path among the ASes from AS1 to AS4, in which the destination device is located. That is, the first path signature may allow the origin device to validate the path AS1-AS2-AS3-AS4. The subsequent path signatures are shown in the routing table 420, whereby each path signature may include the corresponding source device, e.g., the AS in which the corresponding exit router resides, and each subsequent AS along a path to the destination AS, as defined by control plane information associated with the corresponding source device.

After validating the plurality of path signatures, e.g., secure path objects, based on validation information accessible by the origin device, the origin device may check the validation results to determine whether a packet that is sent from the origin device and received by the destination device travels along a particular (e.g., correct) communication path as dictated by control plane information. The origin device may conclude that the sent packet took the path envisioned by the secure control plane when there is always a path, e.g., AS PATH, from the destination device back to the source device that is consistent and valid in every step. In this case, it may be concluded that the testing data packet would have taken a route that is consistent with the validated path in the control plane for every step.

Therefore, as illustrated in FIG. 4, after receiving and validating each secure path object and checking the validation results, the origin device in AS1 may determine that a data plane packet would correctly travel along a path dictated by the control plane to the destination device in AS4, because each path signature includes a valid path from the corresponding source device to the destination device, and because all paths are mutually inclusive.

Figure 5:
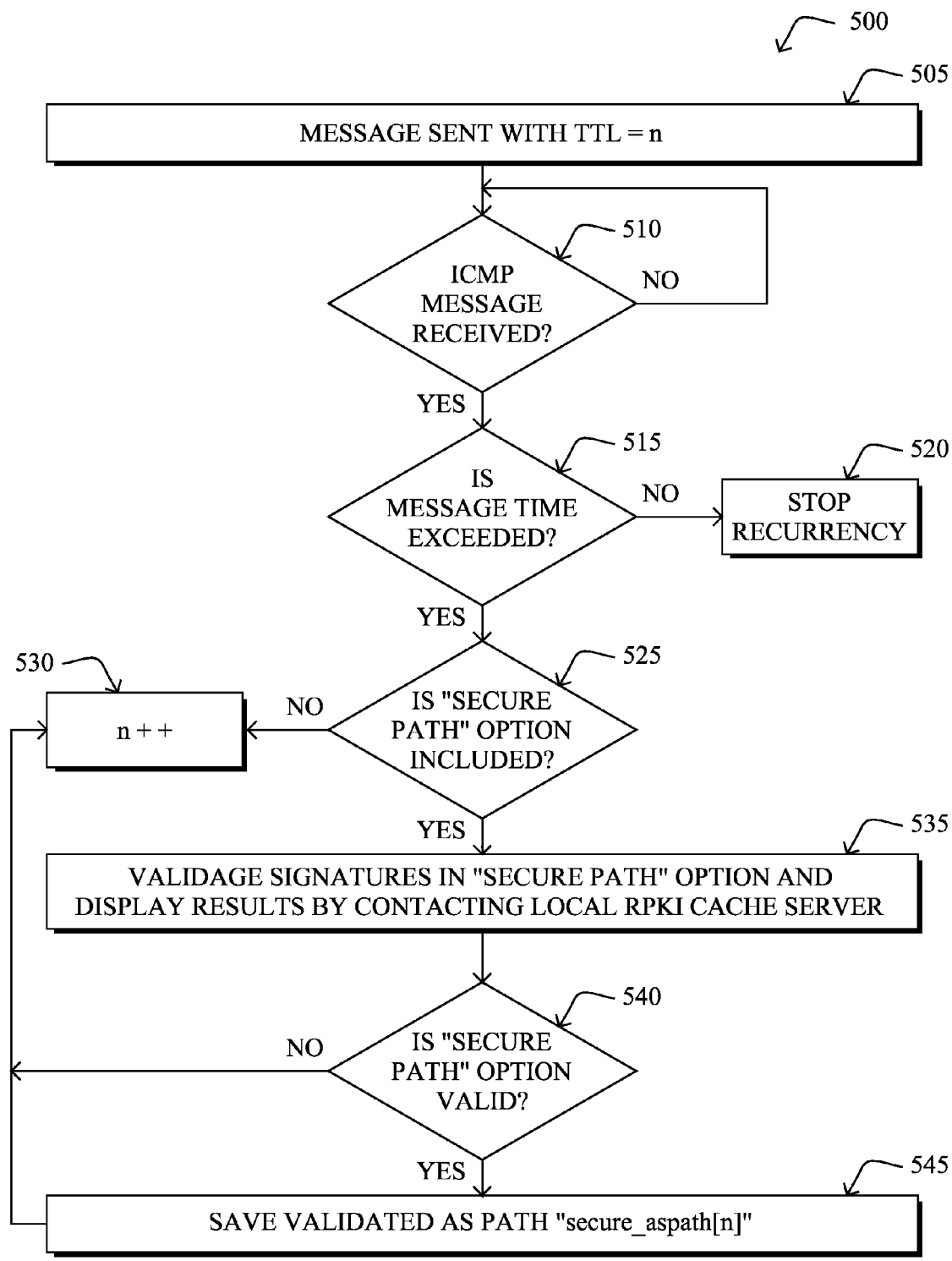
FIG. 5 illustrates an example simplified procedure for a "traceroute" technique using a control plane secure path validation check.

FIG. 5 illustrates an example simplified procedure for a "traceroute" technique using a control plane secure path validation check. The procedure 500 may illustratively begin at step 505, proceed to step 510, and so forth, by which the origin device may check the validity of each response message, e.g., ICMP message, based on validation information, including, for example, RPKI cache server information.

At step 505, a message may be sent from the origin device along a communication path toward the destination device with a lifespan indicator, e.g., TTL, value of 'n'. At step 510, the origin device may receive a response message, e.g., ICMP message. If the message is an ICMP Time Exceeded packet, at step 515, the procedure may continue to step 525. If not, the origin device stops the recurrency procedure at step 520. At step 525, the origin device may determine whether a secure path object, e.g., "secure path option," is included in the response message. If the secure path object is included in the response message, the origin device may then validate the secure path object, or more particularly, validate the path signature (e.g., BGPSEC Path Signature) included in the secure path object at step 535. The origin device may perform the validation step by, for example, contacting a local RPKI cache server. At step 540, if the secure path object is valid, the origin device may save the validated AS PATH, e.g., "secure_aspath[n]," (step 545) and then increase the lifespan indicator value by one (step 530). Alternatively, if the secure path object is invalid, or if no secure path object is included in the received response message, the procedure 50 may continue directly to step 530, where the lifespan indicator value may increase by one. After the lifespan indicator value increases by one, at step 530, the procedure 500 may return to step 505, where the origin device may send a subsequent packet with a lifespan indicator value of 'n+1'.

Figure 6:
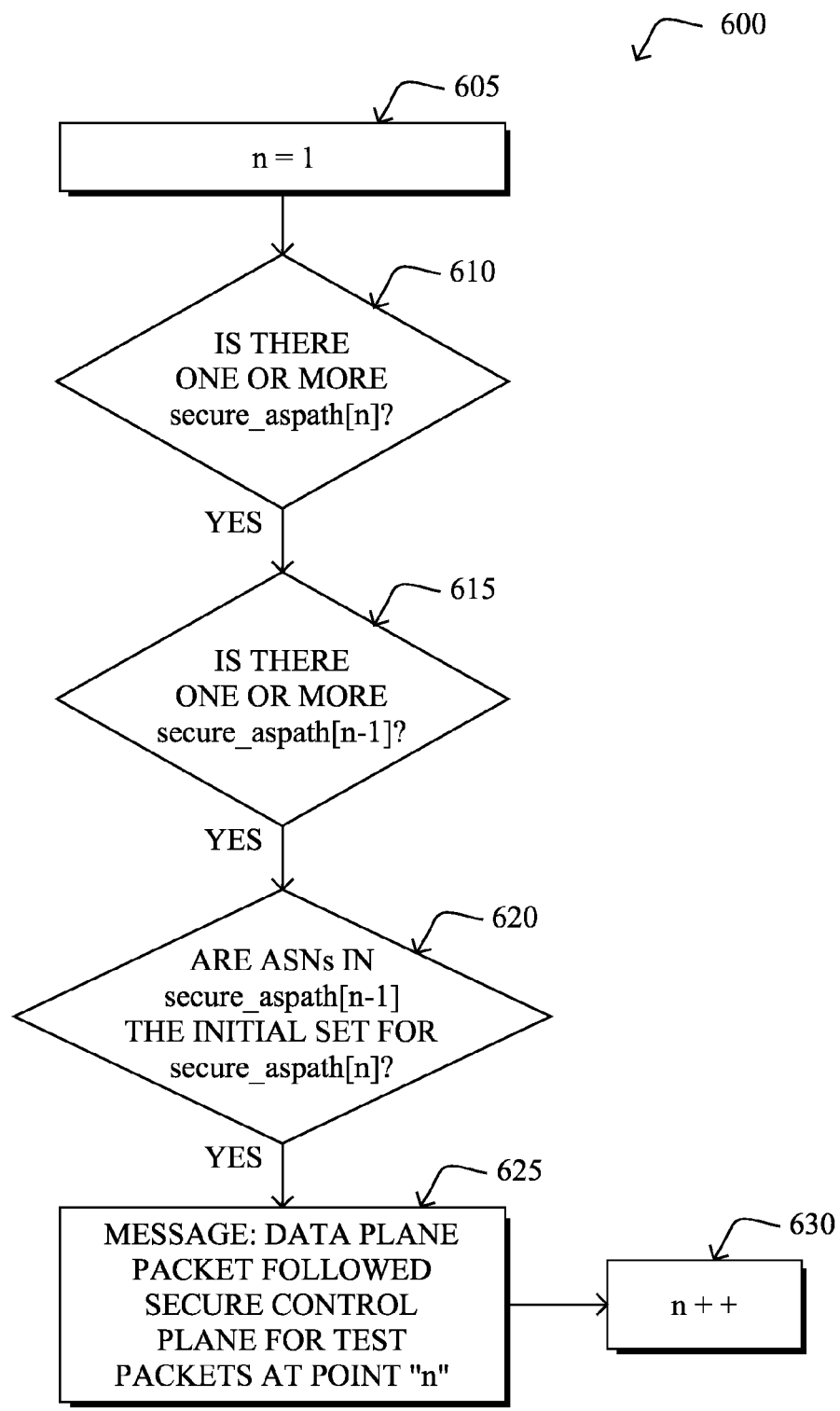
FIG. 6 illustrates an example simplified procedure for a "traceroute" technique using a control plane secure path validation check in the case that multiple validated ASes exist from different validated paths.

FIG. 6 illustrates an example simplified procedure for a "traceroute" technique using a control plane secure path validation check in the case that multiple validated ASes exist from different validated paths. The procedure 600 may illustratively begin at step 605, proceed to step 610, and so forth. Notably, load-balancing may be a concern in real-world network implementations, where complex network topologies with multiple equal-cost multi-path (ECMP) routing options may be typical. Therefore, multiple communication paths may exist between ASes, e.g., a first AS and a second AS. In this case, more than one path option, e.g., AS PATH, may possible for a given lifespan indicator value, e.g., TTL value.

A first approach for this problem may include the procedure 600, whereby the above-described techniques may be run for a large number of packets to try to exhaust all possible paths, which may be performed, for example, by influencing the ECMP hash algorithms. In other words, the validation results of the plurality of secure path objects may be tracked with respect to each of the multiple communication paths. Commonly, the origin device may send the plurality of packets using different source/destination UDP ports. Then, upon receiving the response messages from intermediate devices, as explained above, the origin device may use various techniques to identify which paths have received valid control plane information. For example, the origin device may build a graph of paths from the origin to the destination and designate whether the various paths have received valid control plane information or invalid information.

At step 605, a lifespan indicator value 'n' may be set to one. At step 610, the origin device (or other suitable network device) may determine whether there is more than one available path, e.g., AS PATH, for a lifespan indicator value of 'n', which is set to one. In BGPSEC, a path for a lifespan indicator value of 'n' may be processed as "secure_aspath[n]." If there is more than one secure_aspath[n], then at step 615, the origin device may determine whether there is more than one available path for a lifespan indicator value of 'n−1', e.g., secure_aspath[n−1]. If there is more than one secure_aspath[n−1], then at step 620, the origin device may determine whether there are multiple ASes, or Autonomous System Numbers (ASNs), in the secure_aspath[n−1] that are also in the initial set for the secure_aspath[n]. If so, the origin device may determine that the data plane packet followed the secure control plane for the lifespan indicator value of 'n'. Then, at step 630, the lifespan indicator value may increase by one and return to step 610.

A second approach for the above problem may include encoding the packets sent by the origin device with information related to the topology of the computer network. More specifically, the packets may be encoded with downstream map information, which may lead to a more predictive approach than the above. After sending the packets, e.g., UDP or ICMP probes, with the encoded downstream map information, the origin device may then initiate a "tree-trace" process, as with label switched path ping (LSP Ping) described in Request for Comments (RFC) 6424.

In addition, the disclosed embodiments may be configured to deal with partial deployments, where only a subset of ASes in the computer network is configured according to BGP. In this case, a non-BGP-speaking device in an AS may receive a packet sent by the origin device, but fail to recognize that a response message is required. Thus, when an AS fails to send a response message and is unable to be validated by the origin device, the AS may be added to the network map/graph by using an IP-to-AS mapping. This may be performed based on whois data, e.g., lookup-as( ). As a result, the origin device may determine whether the data plane packets took a control plane-validated communication path toward the destination device, or a path whose control plane validation is unknown.

Figure 7:
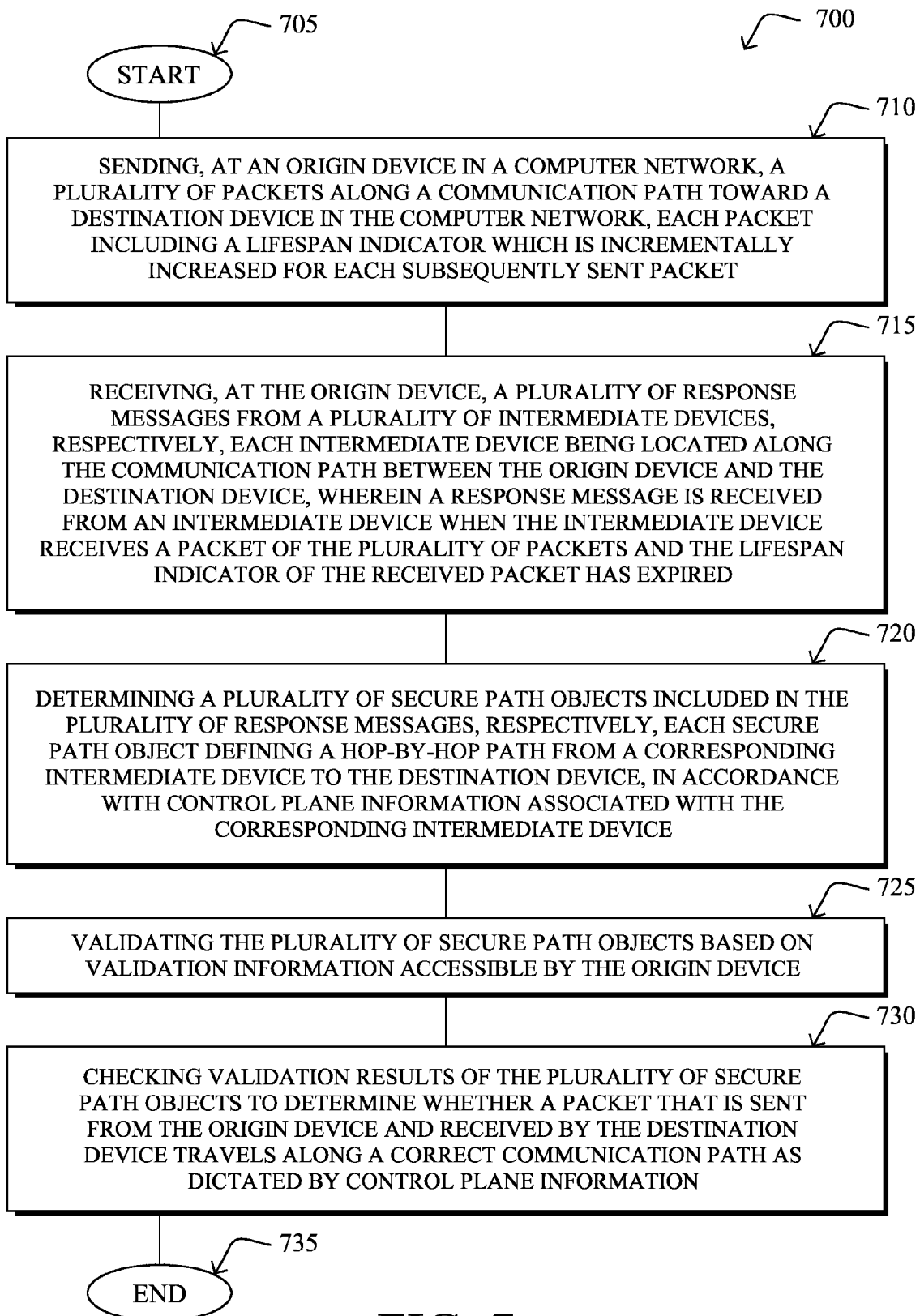
FIG. 7 illustrates an example simplified procedure for verifying whether a data plane packet has taken a path validated at the control plane.

FIG. 7 illustrates an example simplified procedure for verifying whether a data plane packet has taken a path validated at the control plane. The procedure 700 may start at step 705, and continues to step 710, where, as described in greater detail above, it may be verified whether packets are following the secure control plane information.

At step 710, a plurality of packets is sent at an origin device in a computer network along a communication path toward a destination device in the computer network. Each packet includes a lifespan indicator which is incrementally increased for each subsequently sent packet. Then, at step 715, a plurality of response messages are received at the origin device from a plurality of intermediate devices, respectively, whereby each intermediate device is located along the communication path between the origin device and the destination device. Notably, a response message is received from an intermediate device when the intermediate device receives a packet of the plurality of packets and the lifespan indicator of the received packet has expired. At step 720, a plurality of secure path objects included in the plurality of response messages, respectively, is subsequently determined. Each secure path object defines a hop-by-hop path from a corresponding intermediate device to the destination device, in accordance with control plane information associated with the corresponding intermediate device. Additionally, at step 725, the plurality of secure path objects are validated based on validation information accessible by the origin device. Then, at step 730, validation results of the plurality of secure path objects are checked to determine whether a packet that is sent from the origin device and received by the destination device travels along a particular (correct) communication path as dictated by control plane information. The origin device, the destination device, and the plurality of intermediate devices are each part of a respective autonomous system (AS). The procedure 700 illustratively ends at step 735.

Certain steps within procedures 500-700 may be optional, and the steps shown in FIGS. 5-7 are merely examples for illustration, while certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-700 are described separately, certain steps from each procedure may be incorporated into each other procedure, and the procedures are not meant to be mutually exclusive.

The techniques described herein, therefore, provide for verifying whether a data plane packet has taken a path validated at the control plane. In particular, the techniques herein fill a gap in the industry for validating whether the data plane is following the secure control plane, using routers in a path between an origin device and a destination device that dump their secure control plane signed information in a new ICMP extension object, so that the origin device will validate every packet, as well as the consistency of the information received by the different hops.

While there have been shown and described illustrative embodiments that provide for verification of whether a data plane packet has taken a path validated at the control plane, it is to be understood that various other adaptations and modifications may be made within the spirit and scope of the embodiments herein. For example, the embodiments have been shown and described herein with relation to BGP-configured networks. However, the embodiments in their broader sense are not as limited, and may, in fact, be used with other types of inter-AS/domain protocols. That is, while certain protocols are shown, such as BGP and BGPSEC, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a network, a processor coupled to the at least one network interface, and a memory configured to store program instructions executable by the processor. Further, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    sending, from an origin device in a computer network, a plurality of packets along a communication path toward a destination device in the computer network, each packet including a lifespan indicator;
    receiving, at the origin device, a plurality of response messages from a plurality of intermediate devices, respectively, each intermediate device being located along the communication path, wherein a response message communicated by an intermediate device when the intermediate device receives a packet of the plurality of packets and the lifespan indicator of the received packet has expired;
    determining, by the origin device, a plurality of secure path objects included in the plurality of response messages, respectively, each secure path object defining a path from a corresponding intermediate device to the destination device, in accordance with control plane information associated with the corresponding intermediate device and derived from a BGP-based path attribute;
    validating, by the origin device, the plurality of secure path objects based on validation information accessible by the origin device and derived from a Resource Public Key Infrastructure (RPKI) validation server or cache; and
    checking, by the origin device, validation results of the plurality of secure path objects to determine whether a packet that is sent from the origin device and received by the destination device travels along a particular communication path as dictated by control plane information, wherein the origin device, the destination device, and the plurality of intermediate devices are each part of a respective autonomous system (AS),
    wherein when multiple communication paths exist between a first AS and a second AS, the plurality of packets are sent by the origin device such that at least one packet is sent along each of the multiple communication paths, respectively.

2. The method as in claim 1, further comprising:
    tracking the validation results of the plurality of secure path objects with respect to each of the multiple communication paths.

3. The method as in claim 1, wherein each of the plurality of packets is encoded with information related to the topology of the computer network.

4. The method as in claim 1, wherein each of the plurality of intermediate devices is a forwarding device.

5. The method as in claim 1, wherein each of the plurality of intermediate devices is configured according to a border gateway protocol (BGP).

6. The method as in claim 1, wherein a first subset of the plurality of intermediate devices is configured according to a border gateway protocol (BGP), and a second subset of the plurality of intermediate devices is not configured according to BGP.

7. The method as in claim 6, further comprising:
    sending a query to the intermediate devices of the second subset to request identification of those intermediate devices.

8. The method as in claim 1, wherein the lifespan indicator is a time-to-live (TTL) attribute or a hop limit attribute.

9. The method as in claim 1, further comprising:
    storing the validation results of the plurality of secure path objects in a storage device.

10. The method as in claim 1, wherein the checking of the validation results of the plurality of secure path objects occurs in a reverse order from an order in which each response message is received.

11. The method as in claim 1, further comprising:
    receiving, at the origin device, a response message from the destination device indicating that a packet of the plurality of packets has been received at the destination device, wherein the sending of the plurality of packets ceases upon receiving the response message from the destination device.

12. An apparatus, comprising:
    one or more network interfaces that communicate with a computer network;
    a processor coupled to the one or more network interfaces and configured to execute a process; and
    a memory configured to store program instructions which contain the process executable by the processor, the process comprising:
        sending, as an origin device in the computer network, a plurality of packets along a communication path toward a destination device in the computer network, each packet including a lifespan indicator which is incrementally increased for each subsequently sent packet;
        receiving a plurality of response messages from a plurality of intermediate devices, respectively, each intermediate device being located along the communication path between the origin device and the destination device, wherein a response message is received from an intermediate device when the intermediate device receives a packet of the plurality of packets and the lifespan indicator of the received packet has expired;
        determining a plurality of secure path objects included in the plurality of response messages, respectively, each secure path object defining a hop-by-hop path from a corresponding intermediate device to the destination device, in accordance with control plane information associated with the corresponding intermediate device, wherein the secure path object is a dump of a control secure option of the corresponding intermediate device and derived from a BGP-based path attribute;
        validating the plurality of secure path objects based on validation information accessible by the origin device and derived from a Resource Public Key Infrastructure (RPKI) validation server or cache; and verifying whether a packet that is sent from the origin device and received by the destination device travels along a particular communication path as dictated by control plane information, based on validation results of the plurality of secure path objects, wherein the origin device, the destination device, and the plurality of intermediate devices are each part of a respective autonomous system (AS), wherein when multiple communication paths exist between a first AS and a second AS, the plurality of packets are sent by the origin device such that at least one packet is sent along each of the multiple communication paths, respectively.

13. The apparatus as in claim 12, wherein the process further comprises:

tracking the validation results of the plurality of secure path objects with respect to each of the multiple communication paths.

14. The apparatus as in claim 12, wherein each of the plurality of packets is encoded with information related to the topology of the computer network.

15. The apparatus as in claim 12, wherein each of the plurality of intermediate devices is configured according to a border gateway protocol (BGP).

16. The apparatus as in claim 12, wherein a first subset of the plurality of intermediate devices is configured according to a border gateway protocol (BGP), and a second subset of the plurality of intermediate devices is not configured according to BGP.

17. The apparatus as in claim 16, wherein the process further comprises:

sending a query to the intermediate devices of the second subset to request identification of those intermediate devices.

18. The apparatus as in claim 12, wherein the lifespan indicator is a time-to-live (TTL) attribute or a hop limit attribute.

19. A tangible, non-transitory, computer-readable media having software encoded thereon, the software when executed by a processor operable to perform a process comprising:

sending, as an origin device in the computer network, a plurality of packets along a communication path toward a destination device in the computer network, each packet including a lifespan indicator which is incrementally increased for each subsequently sent packet;

receiving a plurality of response messages from a plurality of intermediate devices, respectively, each intermediate device being located along the communication path between the origin device and the destination device, wherein a response message is received from an intermediate device when the intermediate device receives a packet of the plurality of packets and the lifespan indicator of the received packet has expired;

determining a plurality of secure path objects included in the plurality of response messages, respectively, each secure path object defining a hop-by-hop path from a corresponding intermediate device to the destination device, in accordance with control plane information associated with the corresponding intermediate device, wherein the secure path object is a dump of a control secure option of the corresponding intermediate device and derived from a BGP-based path attribute;

validating the plurality of secure path objects based on validation information accessible by the origin device and derived from a Resource Public Key Infrastructure (RPKI) validation server or cache; and verifying whether a packet that is sent from the origin device and received by the destination device travels along a particular communication path as dictated by control plane information, based on validation results of the plurality of secure path objects, wherein the origin device, the destination device, and the plurality of intermediate devices are each part of a respective autonomous system (AS), wherein when multiple communication paths exist between a first AS and a second AS, the plurality of packets are sent by the origin device such that at least one packet is sent along each of the multiple communication paths, respectively.

* * * * *